United States Patent
Stehr

(10) Patent No.: US 10,480,242 B2
(45) Date of Patent: Nov. 19, 2019

(54) DEVICE FOR PROVIDING A CROSSOVER POINT

(71) Applicant: AMRONA AG, Zug (CH)

(72) Inventor: Peter Bernhard Stehr, Wunstorf (DE)

(73) Assignee: AMRONA AG, Zug (CH)

( * ) Notice: Subject to any disclaimer, the term of this patent is extended or adjusted under 35 U.S.C. 154(b) by 287 days.

(21) Appl. No.: 15/322,544

(22) PCT Filed: Apr. 27, 2015

(86) PCT No.: PCT/EP2015/059042
§ 371 (c)(1),
(2) Date: Feb. 23, 2017

(87) PCT Pub. No.: WO2016/005067
PCT Pub. Date: Jan. 14, 2016

(65) Prior Publication Data
US 2017/0157439 A1    Jun. 8, 2017

(30) Foreign Application Priority Data
Jul. 8, 2014  (DE) ......................... 10 2014 109 495

(51) Int. Cl.
*E06B 3/90* (2006.01)
*A62C 3/00* (2006.01)
(Continued)

(52) U.S. Cl.
CPC ................. *E06B 3/90* (2013.01); *A62C 2/22* (2013.01); *A62C 3/002* (2013.01); *B65G 13/00* (2013.01);
(Continued)

(58) Field of Classification Search
CPC .... B01L 1/02; B01L 1/025; B01L 1/04; E06B 3/90; E06B 3/903; E06B 3/906; F24F 3/161
See application file for complete search history.

(56) References Cited

U.S. PATENT DOCUMENTS 5,987,817 A * 11/1999 Hein ......................... E06B 3/90
                                                                                    49/40
2013/0252533 A1 * 9/2013 Mauck .................. B41J 29/393
                                                                                   454/187

FOREIGN PATENT DOCUMENTS

DE          3150777 C1     4/1983
DE          3151506 A1     7/1983
(Continued)

*Primary Examiner* — Andrew D Stclair
(74) *Attorney, Agent, or Firm* — Shumaker, Loop & Kendrick, LLP; James D. Miller

(57) ABSTRACT

The invention relates to a device (100) for providing a crossover point between a first region (1) and a second region (2) hermetically delimited from the first region (1) by means of a wall (10), wherein the device comprises:—a lock chamber (12), which can be inserted into an opening (11) provided in the wall and which has a first opening (13) forming a crossover point between the first region and the lock chamber and which has a second opening (14) forming a crossover point between the second region and the lock chamber;—at least one peripherally circulating element (15), which has at least one passage opening (15.1; 19.1; 15.2; 19.2) and can be moved in relation to the first and the second opening of the lock chamber so that at least a first state, in which the at least one passage opening is substantially aligned with the first opening of the lock chamber and enables access from the first region into the lock chamber and the peripherally circulating element covers the second opening of the lock chamber substantially completely, and a second state, in which the at least one passage opening is (Continued)

Figure 1:
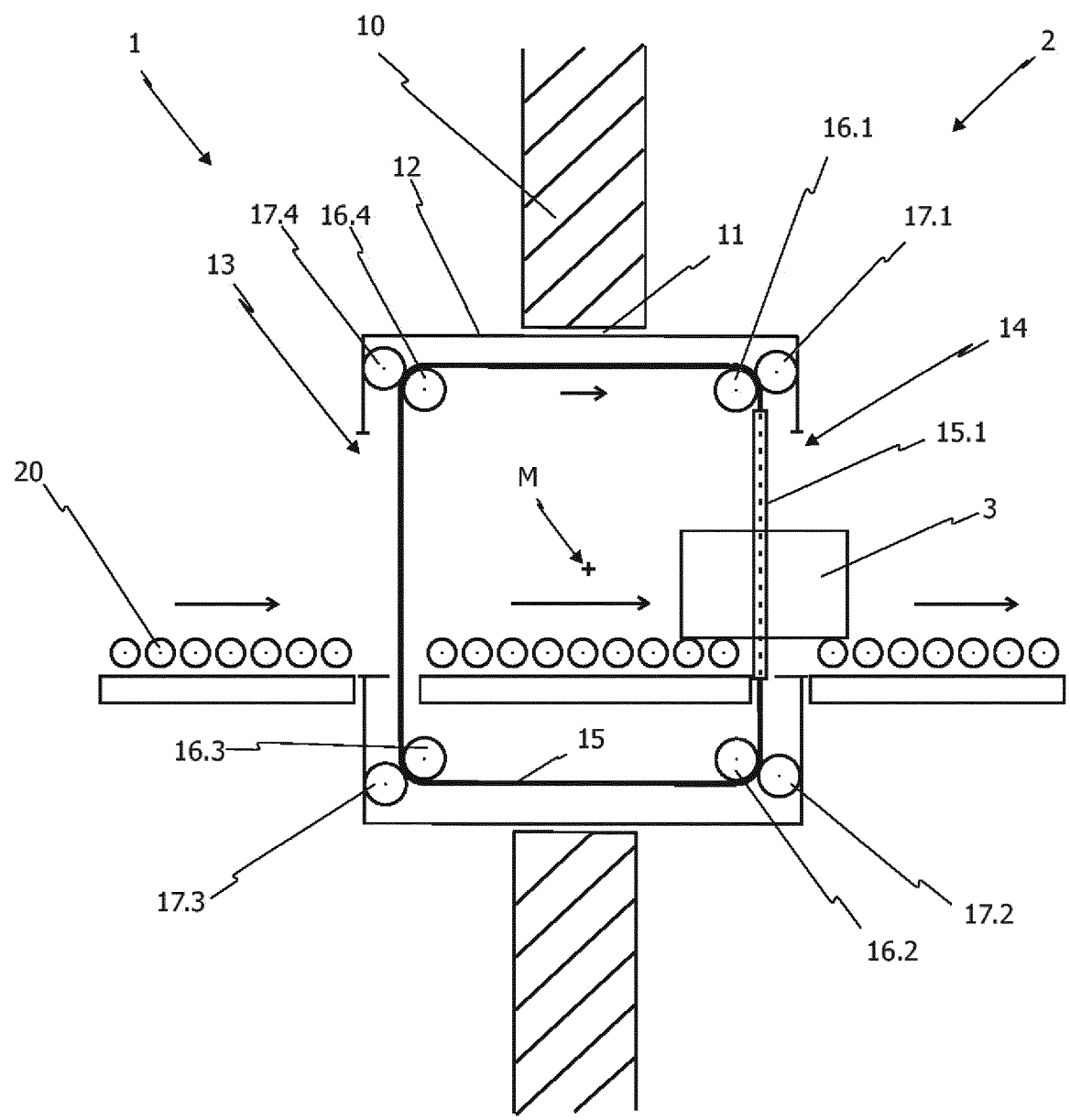

substantially aligned with the second opening of the lock chamber and enables access from the second region into the lock chamber and the peripherally circulating element covers the first opening of the lock chamber substantially completely, can be selectively effected.

7 Claims, 5 Drawing Sheets

(51) Int. Cl.
 *A62C 2/22* (2006.01)
 *E05F 15/73* (2015.01)
 *B65G 13/00* (2006.01)
 *A62C 99/00* (2010.01)

(52) U.S. Cl.
 CPC .......... *E05F 15/73* (2015.01); *A62C 99/0018* (2013.01); *E05Y 2400/44* (2013.01); *E05Y 2400/45* (2013.01); *E05Y 2900/13* (2013.01)

(56) References Cited

FOREIGN PATENT DOCUMENTS

| | | | |
|---|---|---|---|
| EP | 1172127 A2 | 1/2002 | |
| WO | WO-8202224 A1 * | 7/1982 | ............. E05D 15/02 |

\* cited by examiner

DEVICE FOR PROVIDING A CROSSOVER POINT

CROSS-REFERENCE TO RELATED PATENT APPLICATIONS

This patent application is a United States national phase patent application based on PCT/EP2015/059042 filed Apr. 27, 2015, which claims the benefit of German Patent Application No. 10 2014 109495.6 filed Jul. 8, 2014, the disclosures of which are hereby incorporated herein by reference in their entirety.

The invention relates to a device for providing a passage between a first area and a second area hermetically delimited from the first area by means of a wall.

Providing areas of high fire risk (having high fire load) with a continuously inert or sustained partly inerted atmosphere is known in the field of fire protection technology. To this end, a suitable inert gas is introduced into the area of high fire load, if necessary along with monitoring of the concentration. The introduced ratio of inert gas at least partly displaces the oxygen in the room's atmosphere such that the oxygen content is lowered within the space to a level which at least effectively inhibits fire or, as the case may be, even allows for full suppression of fire.

Such a high fire load prevails particularly in storerooms such as for example small-parts warehouses and can be attributed for example to cardboard or plastic packaging, small load carriers and the like. It is hereby known to continuously reduce the oxygen content in such small-parts warehouses by introducing a suitable inert gas such as, for example, nitrogen. Particularly in the case of fully automated small-parts warehouses, this represents a good fire prevention solution, yet these warehouses are often provided with one or more openings to serve in the stocking and/or removing of the parts.

Such continuous oxygen reduction in a storeroom and the like is known from printed publication EP 1 172 127 A2. Such a storeroom as EP 1 172 127 A2 discloses in provided with an airlock for feeding objects in and out. It is disclosed that oxygen enters into the storeroom along with the objects introduced into the inerted room, which is why the oxygen-reduced (inert) atmosphere within the storeroom must be re-established by the subsequent input of inert gas.

In the solution known from EP 1 172 127 A2, it is now provided for the airlock chamber of the so-called inerting airlock, serving in the feeding of objects in and out, to be equipped with a closable opening on the input side as well as a closable opening on the output side which opens out into the storeroom. In order to store small-part goods, the input-side opening of the inerting airlock is thus first opened while the output-side; i.e. the opening of the inerting airlock which opens out into the storeroom, is closed. After the goods to be stored are brought into the airlock, both airlock doors are closed and the inerting airlock is flushed with inert gas. The output-side airlock opening which opens out into the storeroom is opened thereafter so that no unwanted oxygen can enter into the inert storeroom.

This type of known inerting airlock for a storeroom rendered or to be rendered inert does have the disadvantage of a relatively large amount of space being required for the airlock as well as drives, among other things, needing to be provided for the input-side closing element as well as for the output-side closing element of the inerting airlock.

It is therefore the task of the present invention to specify a device of the type cited at the outset which is of comparatively small dimensions and is of constructionally simple and thus economical design.

Thus task is solved by a device in accordance with independent claim 1.

The task is in particular solved by a device for providing a passage between a first area and a second area hermetically delimited from the first area by means of a wall, wherein the device comprises an airlock chamber which can be inserted into an opening provided in the wall and which has a first opening forming a passage between the first area and the airlock chamber and a second opening forming a passage between the second area and the airlock chamber; and wherein the device comprises at least one revolving element having at least one passage opening and is movable relative to the first and the second opening of the airlock chamber so as to be able to alternatingly realize at least one first state in which the at least one passage opening is substantially aligned with the first opening of the airlock chamber and allows entry from the first area into the airlock chamber and the revolving element essentially completely covers the second opening of the airlock chamber, and a second state in which the at least one passage opening or at least a further passage opening is substantially aligned with the second opening of the airlock chamber and allows entry from the second area into the airlock chamber and the revolving element essentially completely covers the first opening of the airlock chamber.

The first area here represents for example the surrounding atmosphere, whereas the second area hermetically delimited therefrom represents a preferably continuously inert room or a partially inerted room such as, for example, a storeroom or the like. This second area is hermetically delimited from the first area such that there can essentially be no exchange of room atmosphere between the two. Only a defined passage between the two spatial atmospheres, however, can also be provided, for example by providing a passage opening of defined size.

In order to feed into the second area, thus for example the warehouse, an insertable airlock chamber is now provided in the wall separating the two areas, same having its own two openings, namely one opening which forms a passage between the first area and the airlock chamber and a second opening which forms the passage between the second area and the airlock chamber.

The at least one revolving element provided therein is now of movable configuration, meaning its at least one passage opening can be moved into a state in which this at least one passage opening is substantially aligned with the first opening of the airlock chamber. This thereby enables entrance into the airlock chamber from the first area specifically through this at least one passage opening of the at least one revolving element. The mobility now enables the alignment of the at least one revolving element to align with at least one passage opening or also at least one further passage opening provided in the revolving element so as to align same with the second opening of the airlock chamber. Entry into the airlock chamber from the second area is then possible, whereby the revolving element essentially completely covers the first opening of the airlock chamber so as to cut off entry from the first area into the airlock chamber in this position.

Because the revolving element with its at least one passage opening moves by itself, a very simple drive concept is possible for such a device. Particularly possible is a relative space-saving drive concept for moving the at least one revolving element, thus for example only one drive. Such a device is hereby particularly well-suited to be retrofit into an existing opening on a wall between a first area and a second area hermetically delimited therefrom.

Particularly preferential is the gas-tight realizing of the covering of the second opening by the at least one revolving element in the position in which the at least one passage opening of the at least one revolving element is substantially aligned with the first opening of the airlock chamber and also the covering of this first opening of the airlock chamber in that position of the at least one revolving element in which its at least one passage opening is aligned with the second opening of the airlock chamber so as to maintain the essentially hermetic separation between the first area and second area at all times. In other words: At no time is there a position at which the at least one revolving element allows direct passage into the airlock chamber through the first opening and, without changing its position, through the second opening into the second area. This thereby ensures that no exchange of gas can take place between the inert or partly inerted atmosphere in the second area and the spatial atmosphere prevailing in the first area (e.g. the surrounding atmosphere), etc.

By the at least one revolving element essentially completely covering the unneeded passage opening at the respective point in time and the accompanying hermetic (gas-tight) barrier, only a defined gas volume-related exchange then occurs between the different spatial atmospheres when the two different opening states are successively assumed during the feeding of the airlock.

It is of course however also possible to flush the airlock chamber with inert gas in the interval during which the at least one revolving element is moving so that reduced or wholly suppressed oxygenation is established in the inert or partly inerted second area.

To this end, it can be additionally provided for the at least one revolving element to be brought into a position for such an infeed process in which the at least one revolving element essentially completely covers both passage openings and thereby establishes an essentially full gas-tight seal between the first area and the second area so that a defined flushing procedure can occur during such a time period.

It is of course also conceivable to produce such a fully closed state of the airlock chamber by means of the revolving element, meaning a state in which the at least one opening of the at least one revolving element is not aligned with either of the two openings of the airlock chamber when there is nothing passing though the airlock chamber. In this case, a defined oxygen concentration can occur by introducing an appropriate inert gas into the airlock chamber even during such non-feeding periods, for example when there should be a sufficient amount of suppliable inert gas available from e.g. a nitrogen generator or the like during such periods. Should there then be feeding activity coming from the outside, i.e. from the first area, although a state is then briefly established in which the airlock chamber is exchanging gas with the first area via the at least one passage opening of the at least one revolving element, namely when the at least one passage opening of the at least one revolving element is aligned with the first opening of the airlock chamber, if this period is kept as short as possible, there is no complete exchange of gas such that flushing the airlock chamber with inert gas is not necessary or only necessary to a minimized extent while the at least one revolving element is moving into the second position.

Advantageous further developments of the inventive solution are set forth in the subclaims.

It is thus for example provided for the at least one revolving element to be a revolving door arranged within the airlock chamber and mounted so as to be displaceable relative to the openings of the airlock chamber preferably about a horizontal or vertical central axis of the airlock chamber. Such a solution is particularly simple in terms of such a revolving door only requiring a comparatively uncomplicated mounting about its respective central axis. Due to its circulating design, it can be further designed to only need one single drive mechanism. In other words: The revolving door only ever needs to be driven in one direction in order to alternatingly assume the first state and the second state. This allows dispensing with complicated and direction-variable drives and/or gear mechanisms for the drive of such a displaceably mounted revolving door.

According to a further aspect of the invention, a detector mechanism is provided to monitor the interior of the airlock chamber, whereby the at least one revolving element is then only movable relative to the openings when the detector mechanism detects a state in which no objects are projecting into the pivoting range of the at least one revolving element.

In the simplest case, such a detector mechanism is a light barrier or the like which detects the presence of objects in the interior of the airlock chamber. Such a light barrier can also be provided directly in the pivoting range; i.e. in the area of the passage opening of the at least one revolving element. It is however of course also possible to provide a camera or the like as such a detector mechanism, its image being automatically evaluated in terms of whether or not an object is situated in the pivoting range.

The mobility of the at least one revolving element as a function of the state of the detector mechanism detecting whether or not any objects are projecting into the pivoting range of the at least one revolving element can hereby be automated by the applicable evaluating of the signal of the detector mechanism. Motion can for example occur by means of a mechanical or electronic blocking or also a controllable coupling (controllable slip clutch) or the like. Particularly when a defined large number of objects are to be fed in or out one after the other, it can thereby make sense for the drive of the at least one revolving element to run continuously at a defined speed so as to enable a paced inflow/outflow of the objects. Only when the pivoting area of the at least one revolving element is not clear of projecting objects at the right point in time due to a misfeed or a mistiming, for example due to a warehouse item being conveyed getting stuck in the pivoting range, can the drive of the at least one revolving element then be cut to same by means of the controllable clutch and continue on in neutral until the disturbance is remedied or the pivoting range is clear again after a readjusting of the conveying pace. This thereby enables particularly low-wear operation.

According to a further aspect of the inventive solution, a drive mechanism is provided to drive the at least one revolving element, whereby the drive mechanism comprises at least one preferably horizontally or vertically extending drive element.

The at least one drive element is preferably a drive roller but can also be configured as a gearwheel, a chain wheel drive, a belt pulley or the like.

Such a preferably horizontally or vertically extending drive element enables a particularly simple driving of the at least one revolving element.

It can moreover be provided in this context to allocate a sealing element extending in the same direction to at least one of the drive elements.

The at least one sealing element is preferably a sealing roller but can also be configured as a gearwheel, a chain wheel drive, a belt pulley or the like.

Such a sealing element extending in the same direction presses against the respective drive element, whereby the at least one revolving element can be led through a flexible roller gap between the drive element and associated sealing element.

Both the drive elements and the sealing elements can be relatively small and thus of readily driven design. When employing drive rollers and sealing rollers, only driving one of the types of rollers (the drive roller) will of course suffice.

Guiding the at least one revolving element through the flexible roller gap between the drive element and associated sealing element enables reliable and simple sealing and thus hermetic separation between the individual areas.

According to a further aspect of the invention, it is provided for the at least one revolving element to comprise two passage openings which are arranged in relation to their relative position to one another such that in a state in which the first passage opening is aligned with one of the two openings of the airlock chamber, the second passage opening is not aligned with either of the two airlock chamber openings, and in a state in which the second passage opening is aligned with one of the airlock chamber's openings, the first passage opening is not aligned with either of the two airlock chamber openings.

Such a configuration enables faster passage of the warehouse stock through the airlock. The two passage openings of the at least one revolving element are thereby arranged so as to be offset such that no state can again obviously be established in which both the first passage opening as well as the second passage opening align with the two openings of the airlock chamber at the same time. Providing a corresponding second passage opening at an appropriate place in the at least one revolving element can, however, shorten the time which passes between establishing the first state for feeding the airlock chamber and establishing the second state for subsequent feeding of the warehouse stock into the second area during an airlock conveyance operation (infeed of warehouse stock or the like).

According to a further aspect of the inventive solution, it is provided for the at least one revolving element to be designed as a horizontally extending rotating body comprising a drum wall in which the at least one passage opening is formed and which is rotatably mounted about a central axis of the airlock chamber relative to the opening of said airlock chamber such that upon the rotating of the rotating body, the at least one passage opening alternatingly aligns with the first opening or with the second opening of the airlock chamber and in each case allows respective entry to same.

It is particularly preferable for the drum wall to thereby be designed such that the rotating body forms a cylinder. This type of configuration enables very easy drive of such a rotating body and its bearing since a central mounting and a central drive can be provided.

A further aspect of the invention provides for using the above-described inventive device as an airlock between an inert room or a room able to be rendered inert, particularly between a stockroom or warehouse and an external area.

Use is however not limited to the above. The device according to the invention can be versatilely used as an airlock and in particular anywhere where the atmosphere of two areas is to be kept permanently separated or, respectively, where air exchange between two areas needs to be minimized. The inventive device can for example also be used as an airlock in laboratories, chemical storage or pharmaceutical storage facilities, cold-storage rooms, etc.

According to a further aspect of the invention, it is provided for an installation for storing and/or processing objects under inert conditions to comprise an area enclosed by a spatial shell, wherein at least part of the spatial shell is designed as a wall in which the at least one opening is provided for introducing objects into the enclosed area; and wherein the installation comprises an inventive device as described above, whereby the airlock chamber of the device is arranged in the wall opening of the enclosed area; and wherein the installation comprises a device for providing, preferably on an as-needed basis, an inert gas in the form of an oxygen-displacing gas or gas mixture, whereby the provision is controllable such that at least a portion of the provided inert gas is conducted into the enclosed area to establish an oxygen-reduced atmosphere in the enclosed area.

The following will reference the drawings in describing example embodiments of the solution according to the invention in greater detail.

Figure 2:
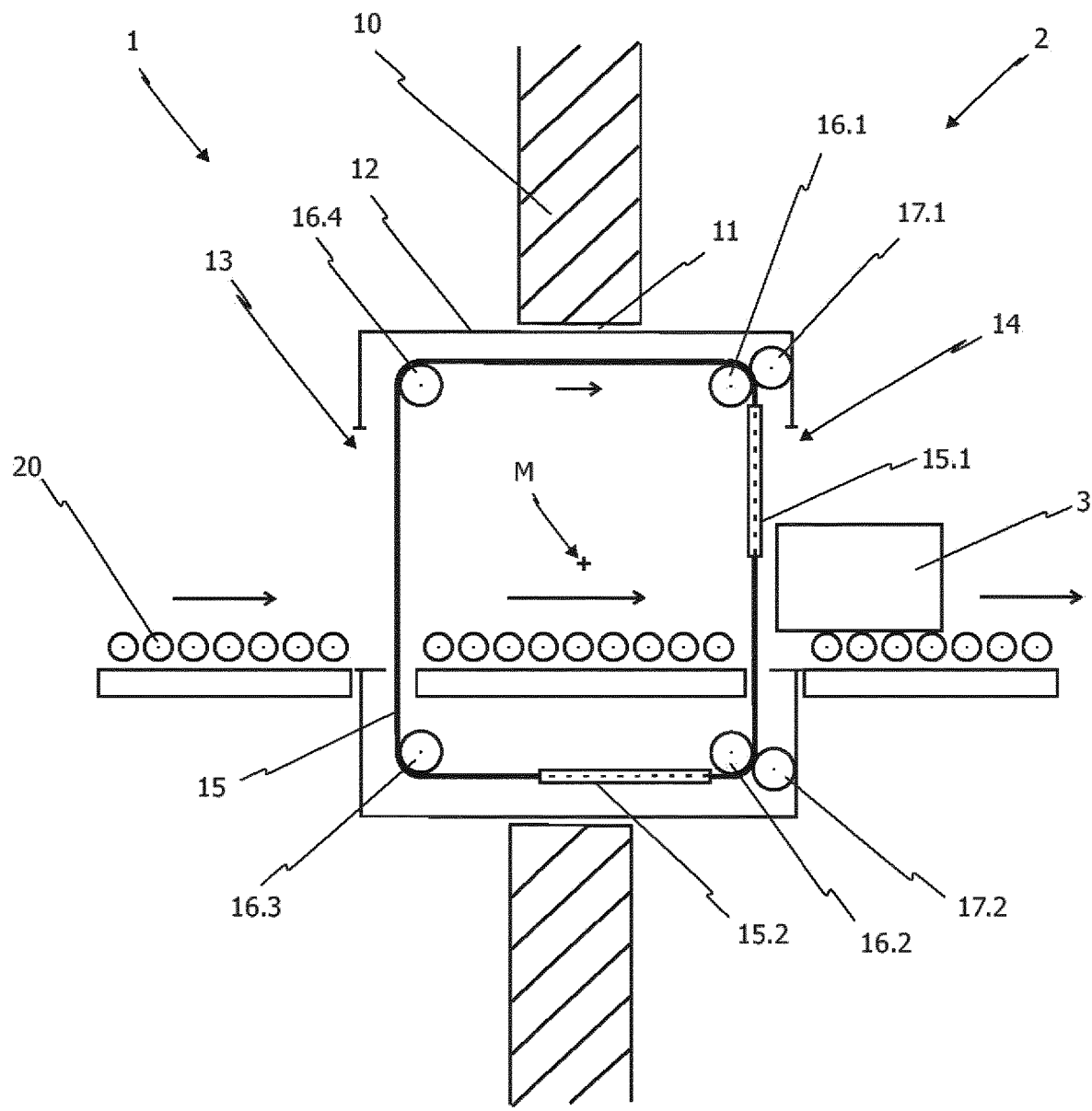
Figure 3:
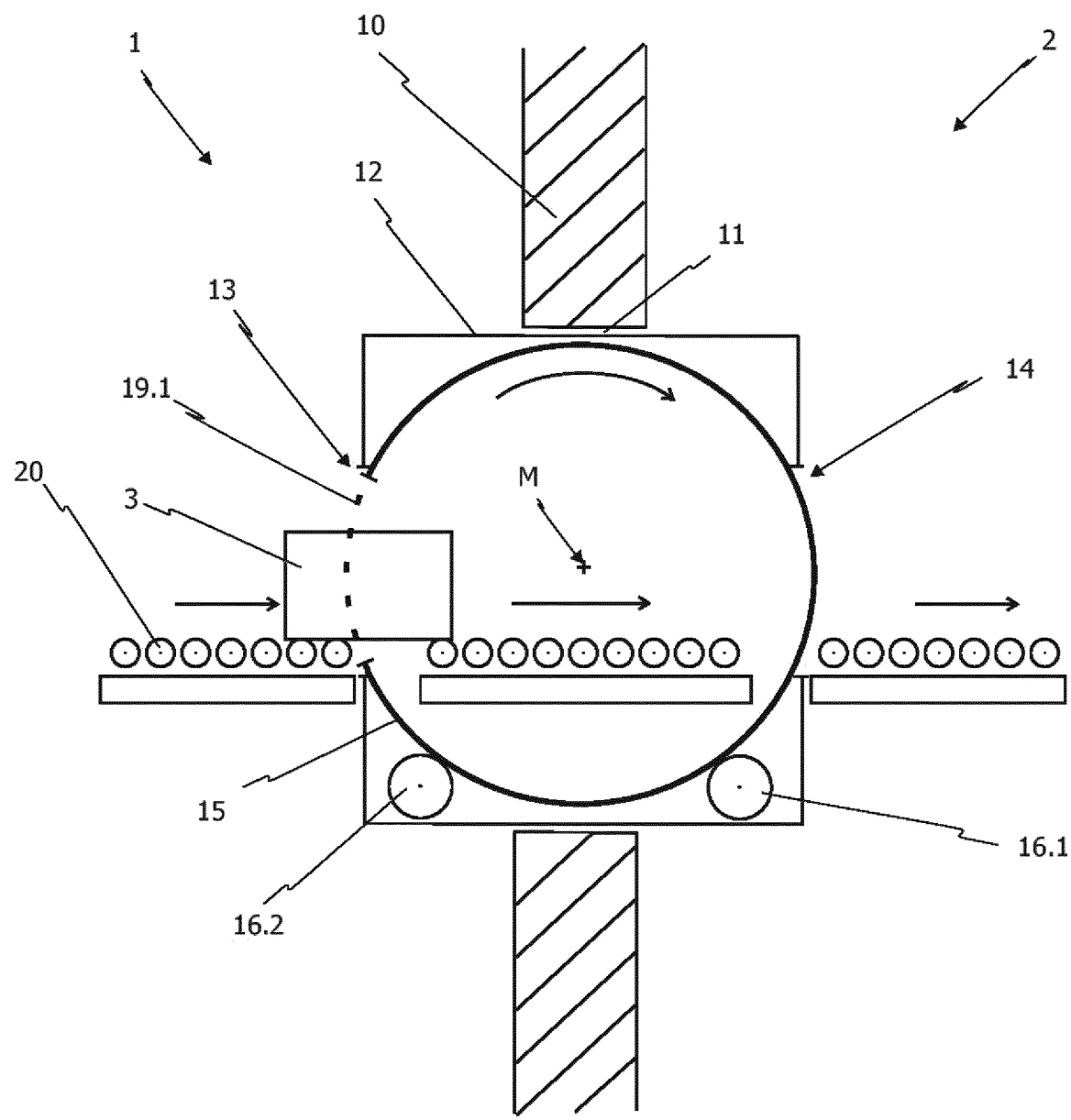
Figure 4:
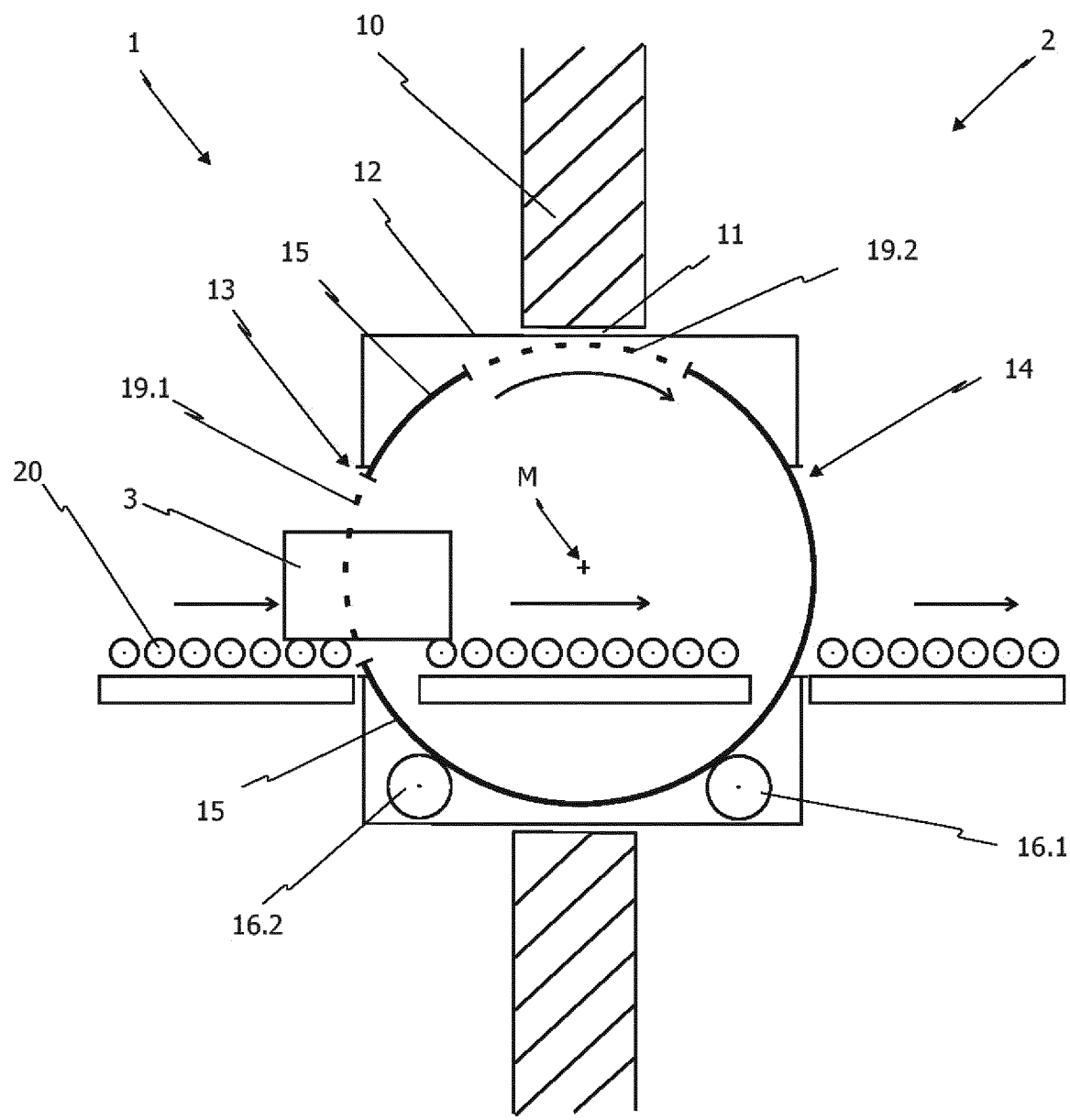
Figure 5:
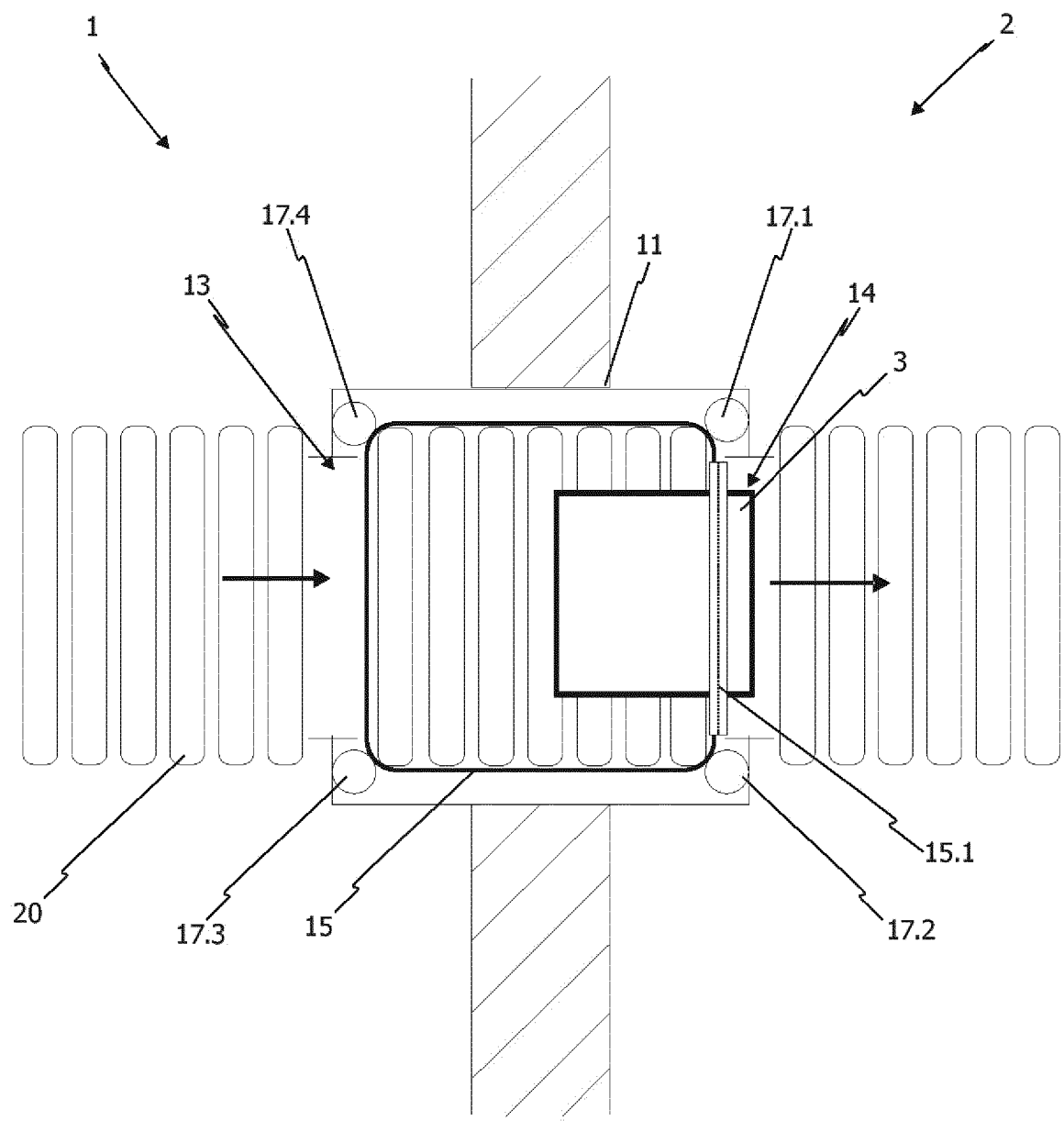

Shown are:

FIG. 1: a side sectional view of a device according to the invention for providing a passage between a first area and a second area which is hermetically delimited from the first area by means of a wall in accordance with a first embodiment of the invention;

FIG. 2: a side sectional view similar to that of FIG. 1 of an inventive device according to a second embodiment of the invention;

FIG. 3: a side sectional view similar to that of FIGS. 1 and 2 of an inventive device according to a third embodiment of the invention;

FIG. 4: a side sectional view similar to that of FIGS. 1 to 3 of an inventive device according to a fourth embodiment of the invention; and FIG. 5: a sectional plan view of an inventive device for providing a passage between a first area and a second area hermetically delimited from the first area by means of a wall in accordance with a fifth embodiment of the invention.

FIG. 1 shows a side sectional view of a device 100 according to the invention for providing a passage between a first area 1 and a second area 2 hermetically delimited from the first area 1 by means of a wall 10 in accordance with a first embodiment of the invention.

In this example, the first area 1 is not rendered inert, meaning that it is at normal ambient atmosphere. The second area 2, however, is a room rendered continuously inert or partly inert, for example a storeroom in which a suitable inert gas such as for example nitrogen, argon or the like is introduced to reduce the risk of fire.

The first area 1 is separated from the second area 2 by means of a wall 10, whereby an opening 11 is formed in the wall 10 for the introducing of warehouse stock 3. This opening 11 of course also serves in subsequently discharging the warehouse stock 3 again in the opposite direction, meaning from area 2 into area 1. The warehouse stock 3 indicated schematically in FIG. 1 is thereby conveyed along adjacent rotatingly supported conveyor rollers 20. The conveyor rollers 20 can be self-powered to move the warehouse stock 3; alternatively, however, it is also possible to utilize the inertial mass of the warehouse stock 3 to passively move it on non-driven rollers through the device 100 between areas 1, 2.

As is evident from the FIG. 1 side view, an airlock chamber 12 is inserted into the opening 11 provided in the wall 10 in the inventive device identified as a whole by reference numeral 100 according to the first embodiment. This airlock chamber 12 for its part has a first opening 13 and a second opening 14. The first opening 13 forms a passage between the first area 1 and the airlock chamber 12. Analogously, the second opening 14 forms a passage between the second area 2 and the airlock chamber 12.

A revolving element 15 is arranged within the airlock chamber 12 which is, for its part, essentially gas-tight and to that end is composed of a suitable material such as for example rubber of limited flexibility or the like.

The revolving element 15 is braced within the airlock chamber 12 by four drive rollers 16.1, 16.2, 16.3, 16.4 and can be rotatingly driven within the airlock chamber 12 in the direction of rotation, identified by a short arrow, similar to a conveyor belt.

In accordance with the first embodiment depicted in FIG. 1, the revolving element 15 comprises just one passage opening 15.1, which can be brought into several positions by the appropriate driving of the drive rollers 16.1, 16.2, 16.3, 16.4. In the position depicted in FIG. 1, the second opening 14 of the airlock chamber aligns with the passage opening 15.1 of the revolving element 15 so that a passage route is created between the interior of the airlock chamber 12; i.e. the interior spanned by the revolving element 15, and the second area 2. By the drive rollers 16.1, 16.2, 16.3, 16.4 correspondingly moving the revolving element 15, this opening 15.1 of the revolving element 15 is then able to be initially moved such that there is no aligning connection to either the first opening 13 nor to the second opening 14. In this case, the interior of the airlock chamber 12 as limited by the revolving element 15 is hermetically sealed. If the drive rollers 16.1, 16.2, 16.3, 16.4 now move the revolving element 15 further, the passage opening 15.1 of the revolving element 15 thereafter aligns with the first opening 13 and thus establishes a connection between the interior as limited by the revolving element 15, meaning the interior of the airlock chamber 12, and the first area 1.

In this aligned state, objects (warehouse stock 3) entering into area 2; i.e. into the storeroom, can then for example be brought into the interior of the airlock chamber 12. When the revolving element 15 is moved further, a state is again assumed in which the area within the airlock chamber 12 enclosed by the revolving element 15 is neither connected to the first area 1 nor to the second area. In this state, an inert gas, which is also provided in the second area 2, can for example be introduced into the interior within the airlock chamber 12.

When the drive rollers 16.1, 16.2, 16.3, 16.4 move the revolving element 15 further, the state as depicted in FIG. 1 is then re-established. In result of an appropriate inert gas concentration being introduced into the interior limited by the revolving element 15, only a reduced entry of oxygen then follows when conveying the warehouse stock 3 into the second area 2 through the aligned passage opening 15.1.

In order to be able to maintain the respective gas-tight states, associated sealing rollers 17.1, 17.2, 17.3, 17.4 rotating in the same direction are respectively allocated to the drive rollers 16.1, 16.2, 16.3, 16.4 on the opposite side of the inner wall of the airlock chamber 12. Since it is particularly necessary to have a defined sealing of the inert second area 2, sealing rollers 17.3 and 17.4 can then also be omitted when there is no provision for interim flushing of the interior enclosed by the revolving element 15 when warehouse stock 3 is being introduced.

FIG. 2 shows a side sectional view of a second embodiment of the inventive device 100 which constitutes a modification of the device 100 according to the first embodiment. In contrast to the FIG. 1 depiction; i.e. in contrast to the first embodiment, sealing rollers 17.3 and 17.4 have been omitted. Moreover, the revolving element 15 now exhibits a further second passage opening 15.2 here in addition to the first passage opening 15.1. As is clear from the side sectional view of FIG. 2, the dimensions and the respective arrangement of the passage openings 15.1, 15.2 are configured such that upon the revolving element 15 being driven by the drive rollers 16.1, 16.2, 16.3, 16.4, at no point in time is there a direct passage route; i.e. a direct alignment of both passage openings 15.1, 15.2 to the first openings 13 or second opening 14 respectively at any one time. In other words: there is always a hermetic separation between the first area 1 and the second area 2 even when the revolving element 15 makes a revolution.

Providing an additional second passage opening 15.2 in the revolving element 15 can in particular minimize the paced inflow of warehouse stock 3 during the conveyance period since the continuing hermetic sealing between the first area 1 and the second area 2 and the thus accompanying only defined introduction of oxygen into the inerted area 2 compared to the first embodiment often establishes a condition in which the warehouse stock 3 is brought into the interior of the airlock chamber 12 or can be conveyed out of same again respectively.

FIG. 3 shows a side sectional view of the inventive device 100 according to a third embodiment of the invention. In this third embodiment, the revolving element 15 is designed as a cylindrical and horizontally extending rotating body about a horizontal central axis M. In this third embodiment of the inventive solution, this rotating body comprises a drum wall in which a passage opening 19.1 is formed which is rotatable about the central axis relative to the openings 13, 14 of the airlock chamber 12. By the rotating body turning about the central axis, the passage opening 19.1 can be alternatingly brought into aligning connection with the first area 1 or with the second area 2 respectively via the first opening 13 or second opening 14 of the airlock chamber 12. Providing a rotatably mounted rotatable body is particularly useful when a simple lateral bearing of this rotating body is possible. Two drive rollers 16.1, 16.2 are provided in the third embodiment to drive the rotating body; i.e. to drive the cylindrical revolving element 15, said drive rollers not however being required in this embodiment to brace the revolving element 15 and keep it in its shape. It is therefore readily possible for these drive rollers 16.1, 16.2 to press against the rotating body; i.e. the revolving element 15, from the outside, and apply the driving force to circulate the revolving element 15 externally.

In all other respects, reference is made to the remarks provided with respect to the first embodiment.

FIG. 4 shows a side sectional view of an inventive device 100 according to a fourth embodiment of the invention similar to the third embodiment from FIG. 3.

A second passage opening 19.2 is provided in the rotating body additionally to the first passage opening 19.1 in the device 100 according to the fourth embodiment, same being arranged at an offset from the first passage opening 19.1. In turn, and similar to the second embodiment in FIG. 2, the revolving element 15; i.e. the cylindrical rotating body, again cannot be brought into a position in which the first passage opening 19.1 and the second passage opening 19.2 simultaneously align with openings 13/14 such that a hermetic sealing prevails at all times between the first area 1 and the second area 2.

At the same time, however, one implementation pursuant to the fourth embodiment allows the same advantages as with the second embodiment, meaning in principle an increased inflow/outflow pace of incoming/outgoing warehouse stock.

FIG. 5 shows a sectional plan view of an inventive device 100 for providing a passage between a first area 1 and a second area 2 hermetically delimited from the first area 1 by means of a wall 10 in accordance with a fifth embodiment of the invention.

The device 100 according to the fifth embodiment depicted in FIG. 5 differs from the first embodiment described above in that both the revolving element 15 as well as the associated drive elements (drive rollers), which are not depicted in the interest of simplicity, and their respectively allocated sealing rollers 17.1, 17.2, 17.3, 17.4 extend vertically.

As is evident from FIG. 5, the warehouse stock 3 can again be moved along conveyor rollers 20 through the airlock chamber of the device 100 between the first area 1 and the second area 2 by passing through the passage opening 15.1 of the revolving element 15. In all other respects, reference is made to the remarks provided above.

It is noted at this point that the embodiments are not to be regarded as limiting. In particular, the embodiments of the invention can be combined with one another and/or modified within the scope of the invention in any way. Such combinations, modifications and/or additions will be familiar to one skilled in the art.

LIST OF REFERENCE NUMERALS 100 device for providing a passage
1 first area
2 second area
3 warehouse stock
10 wall
11 opening
12 airlock chamber
13 first opening
14 second opening
15 revolving element
15.1, 19.1, 15.2, 19.2 passage opening
M central axis
16.1, 16.2, 16.3, 16.4 drive roller
17.1, 17.2 sealing roller
20 conveyor roller

The invention claimed is:

1. A device (100) for providing a passage between a first area (1) and a second area (2) which is hermetically delimited from the first area (1) by means of a wall (10), wherein the device (100) comprises the following:
an airlock chamber (12) which can be inserted into an opening (11) provided in the wall (10) which has a first opening (13) forming a passage between the first area (1) and the airlock chamber (12) and which has a second opening (14) forming a passage between the second area (2) and the airlock chamber (12); and
a revolving element (15) configured as one of a conveyor belt and a drum wall for separating the first opening (13) from the second opening (14) having at least one passage opening (15.1; 19.1; 15.2, 19.2), the revolving element movable relative to the first opening and the second opening (13, 14) of the airlock chamber (12) so as to be able to alternatingly realize at least one first state in which the at least one passage opening (15.1; 19; 19.1) is substantially aligned with the first opening (13) of the airlock chamber (12) and allows entry from the first area (1) into the airlock chamber (12) and the revolving element (15) essentially completely covers the second opening (14) of the airlock chamber (12), and a second state in which the at least one passage opening (15.1; 19.1; 15.2, 19.2) or at least a further passage opening (15.1, 19.1, 15.2, 19.2) is substantially aligned with the second opening (14) of the airlock chamber (12) and allows entry from the second area (2) into the airlock chamber (12) and the revolving element (15) essentially completely covers the first opening (13) of the airlock chamber (12);
wherein the revolving element (15) comprises two passage openings (15.1, 15.2) which are arranged in relation to their relative position to one another such that in a state in which a first one of the passage openings (15.1) is aligned with one of the first opening and the second opening (13, 14) of the airlock chamber (12), a second one of the passage openings (15.2) is not aligned with either of the first opening and the second opening (13, 14) of the airlock chamber (12), and in a state in which the second one of the passage openings (15.2) is aligned with one of the first opening and the second opening (13, 14) of the airlock chamber (12), the first one of the passage openings (15.1) is not aligned with either of the first opening and the second opening (13, 14) of the airlock chamber (12).

2. The device according to claim 1, wherein a drive mechanism is provided to drive the revolving element (15), wherein the drive mechanism comprises at least one horizontally or vertically extending drive element (16.1, 16.2, 16.3, 16.4), wherein the at least one drive element (16.1, 16.2, 16.3, 16.4) is a drive roller.

3. The device according to claim 2, wherein at least one sealing element (17.1, 17.2) extending in a same direction is allocated to at least one of the at least one drive element (16.1, 16.2) which presses against the at least one of the at least one drive element (16.1, 16.2), wherein the revolving element (15) can be led through a flexible roller gap between the at least one of the at least one drive element (16.1, 16.2) and the at least one sealing element (17.1, 17.2).

4. A method for an air locked guiding of warehouse stock between a room (2) which is or is able to be rendered inert and an external area (1) by a device according to claim 1, the method comprising steps of:
providing a detector mechanism configured as one of a light barrier or a camera; and
monitoring an interior of the airlock chamber (12) with the detector mechanism, wherein the revolving element (15) is then only movable relative to the openings (13, 14) when the detector mechanism detects a state in which no objects are projecting into a pivoting range of the revolving element (15).

5. An installation for storing and/or processing objects under inert conditions, wherein the installation comprises the following:
an area (2) enclosed by a spatial shell, wherein at least part of the spatial shell is designed as a wall (10) in which the at least one opening (11) is provided for introducing objects into the enclosed area (2);
a device (100) in accordance with claim 1, wherein the airlock chamber (12) of the device (100) is arranged in the wall opening (11) of the enclosed area (2); and
a device for providing, on an as-needed basis, an inert gas in the form of an oxygen-displacing gas or gas mixture, wherein the device for providing is controllable such that at least a portion of the inert gas provided is conducted into the enclosed area (2) to establish an oxygen-reduced atmosphere in the enclosed area (2).

6. The device according to claim 3, where the at least one sealing element (17.1, 17.2) includes a sealing roller extending in the same direction.

7. The method according to claim 4, where the room (2) is a stockroom or warehouse.

\* \* \* \* \*